Oct. 13, 1931.  E. P. PERUN  1,827,164
CHEESE CUTTER
Filed Jan. 14, 1931   3 Sheets-Sheet 1
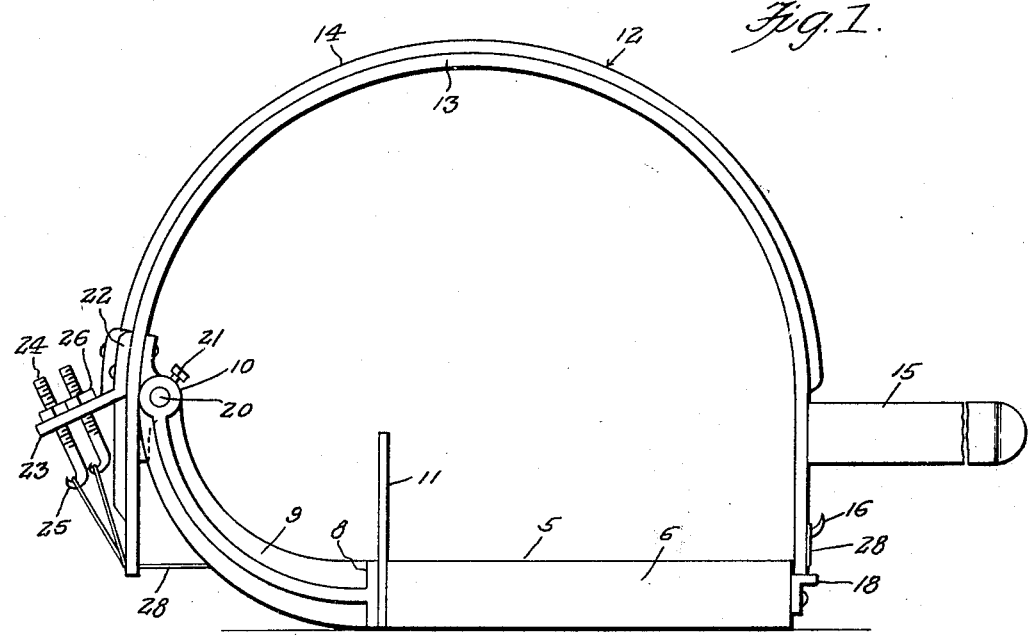
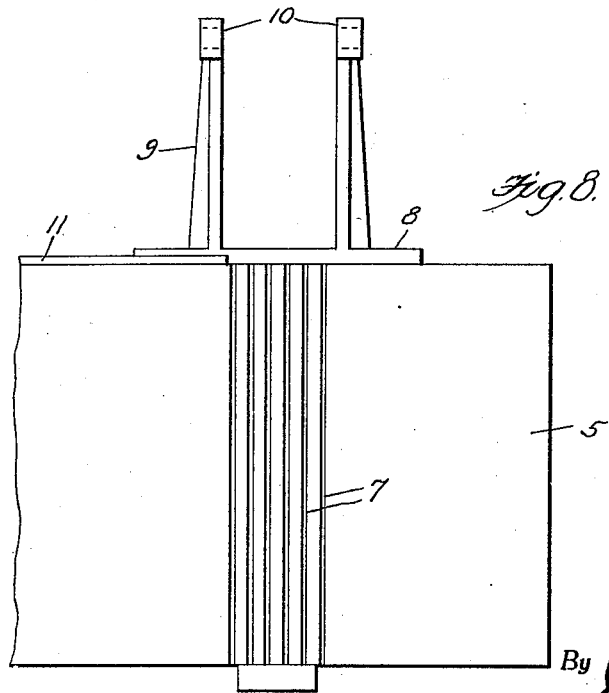
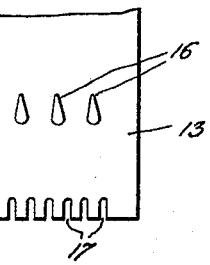
Inventor
Edward P. Perun,
By Clarence A. O'Brien
Attorney

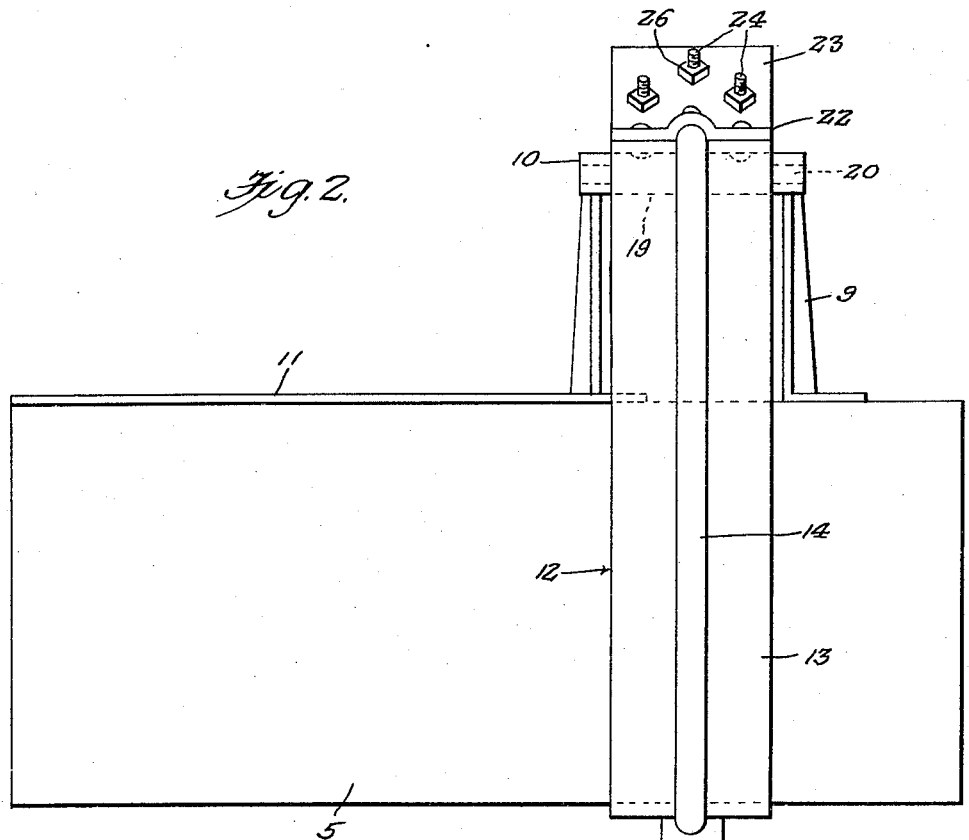
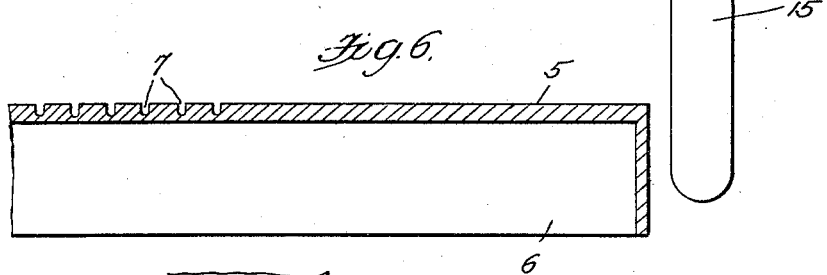
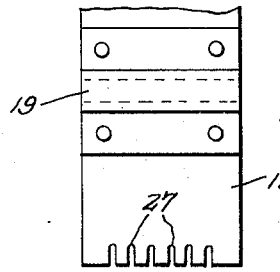

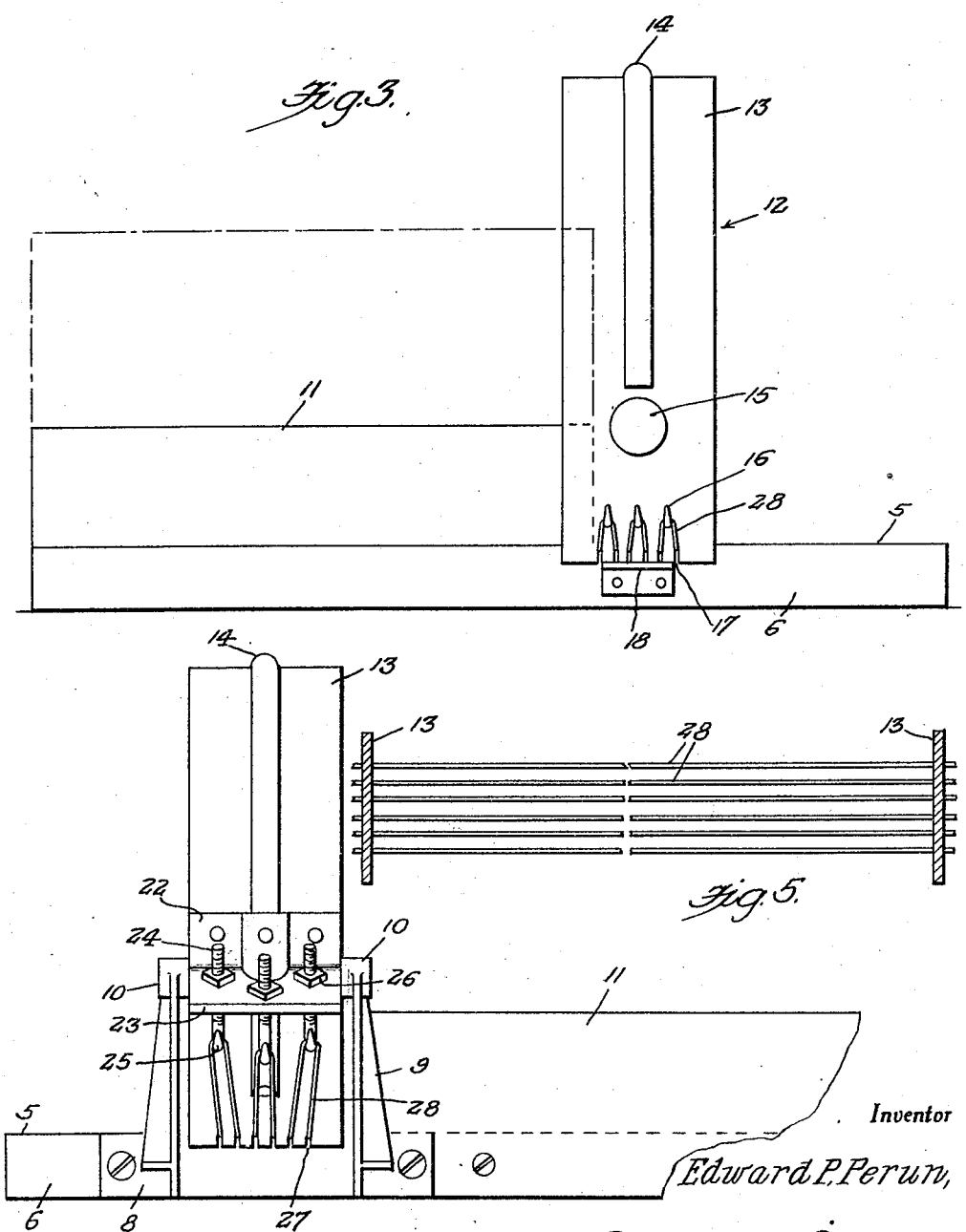

Patented Oct. 13, 1931

1,827,164

UNITED STATES PATENT OFFICE

EDWARD P. PERUN, OF TORONTO, OHIO

CHEESE CUTTER

Application filed January 14, 1931. Serial No. 503,775.

This invention relates to new and useful improvements in cheese cutters, and more particularly to a cutter of the hand operated type.

The principal object of this invention is to provide a cheese cutter capable of being operated continuously and which in operation will be positive-acting and adapted for cutting cheese into slices of uniform thickness.

Another important object of the invention is to provide a cheese cutter wherein the cutting elements are readily replaceable.

These and other numerous important objects and advantages of the invention will become apparent to the reader of the following specification and claim.

In the drawings:—

Figure 1 represents a side elevational view of the machine.

Fig. 2 represents a top plan view of the machine.

Fig. 3 represents an end elevational view of the machine.

Fig. 4 represents a fragmentary end elevational view looking at the end thereof opposite from the end shown in Fig. 3.

Fig. 5 represents a fragmentary sectional view of the cutting elements.

Fig. 6 represents a fragmentary longitudinal sectional view of the board.

Fig. 7 represents a fragmentary inside elevational view showing one end of the cutter frame.

Fig. 8 represents a fragmentary top plan view of the machine with the cutter removed.

Fig. 9 represents a fragmentary outside elevational view of the cutter frame.

Referring to the drawings wherein like numerals designate like parts, it can be seen that numeral 5 represents the board or platform supported by the depending hinges 6. At a point adjacent one end of the board 5 are the transversely extending parallel grooves 7 at equal spaced intervals.

As is clearly shown in Fig. 8 and further shown in Figs. 1 and 2, the flange 6 at one side of the machine 6 is the plate 8 from which extend the upwardly curved arms 9—9, each being provided with a bearing 10 at its upper end. An upstanding flange 11 extends from this plate 8 along one side of the machine and against this the block of cheese may be pressed and slid toward the cutter, which is generally referred to by numeral 12.

The cutter 12 includes an inverted U-shaped frame having a reinforcing plate extending longitudinally thereof. At one end of the frame 13 is an outstanding handle 15 and a plurality of upwardly disposed hooks 16 located above the notches 17 in the adjacent end of the frame. This end of the frame rests upon the angle irons 18 secured to the adjacent flange 6 of the board 5 when the cutter is not in use.

The inner side of the U-shaped frame 13 at the opposite end portion thereof is provided with the tubular formation 19 thru which the pin 20 extends. This pin also extends thru the bearings 10 and 10 and suitable securing means 21 may be employed for securing the pin 20 to the aforementioned tubular formation 19. Thus the frame is rockably supported on the arms 9—9 and it will here be observed that the frame 13 is located immediately above the grooves 7 in the bore 5.

Secured to the outer side of the frame 13 adjacent the tubular formation 19 is the plate 22 and obliquely downwardly disposed flange 23, thru which a plurality of bolts 24 are feedable, each being provided with a hook 25 at its lower end. Jamb nuts 26 are provided on the bolts 24 for securing the bolt in an adjusted position, and at the end of the frame 13, below the plate 22 are notches 27 provided. Elongated wire strands 28 are trained thru the notches 17 and 27 at the ends of the frame 13 and over the hooks 16 and 25.

The bolts 24 can be adjusted to draw the wire cutting elements 28 taut, and obviously by releasing these bolts 24, the elements can be removed for the purpose of replacement.

When the parts are assembled in the manner shown in Fig. 1, the frame is swung upwardly and the cheese is placed thereunder. By moving downwardly on the frame, the wires will pass thru the block of cheese and divide a portion thereof into a predetermined number of slices each of uniform thickness.

While the foregoing specifications sets forth the invention in specific terms, it is to be understood that numerous changes in the shape, size and materials may be resorted to without departing from the spirit and scope of the invention as claimed hereinafter.

Having thus described my invention, what I claim as new is:—

A cutter device of the class described comprising a platform having parallel grooves in its upper face, brackets connected to the rear edge of the platform and having upwardly curved arms thereon extending rearwardly, and an inverted U-shaped frame having its rear limb hinged to the free end of the arms, a distance from the lower end of said limb, the ends of the limbs having notches therein, wires stretched across the frame and passing through the notches, means for connecting the front ends of the wires to the front limb of the frame, an outwardly extending flange on the rear limb and located an appreciable distance from the end of said limb, and hooks carried by said flange and engaging the rear ends of the wire.

In testimony whereof I affix my signature.

EDWARD P. PERUN.